United States Patent [19]

Richmann et al.

[11] Patent Number: 5,200,034
[45] Date of Patent: Apr. 6, 1993

[54] USE OF SURFACTANTS HAVING AN HLB LESS THAN 10 IN THE DEINKING OF DRY TONER ELECTROSTATIC PRINTED WASTEPAPER

[75] Inventors: Sandra K. Richmann, Jacksonville Beach; Mary B. Letscher, Jacksonville, both of Fla.

[73] Assignee: Betz PaperChem, Inc., Jacksonville, Fla.

[21] Appl. No.: 691,201

[22] Filed: Apr. 25, 1991

[51] Int. Cl.$^5$ .............................................. D21C 5/02
[52] U.S. Cl. ............................................ 162/5; 162/8
[58] Field of Search ................................. 162/5, 8

[56] References Cited

U.S. PATENT DOCUMENTS

| | | | |
|---|---|---|---|
| 3,635,789 | 1/1972 | Green | 162/5 |
| 3,764,460 | 10/1973 | Miyamoto et al. | 162/5 |
| 4,162,186 | 7/1979 | Wood et al. | 162/8 |
| 4,231,841 | 11/1980 | Calmanti et al. | 162/8 |
| 4,276,118 | 6/1981 | Quick | 162/55 |
| 4,360,439 | 11/1982 | Calmanti et al. | 162/5 |
| 4,376,011 | 3/1983 | Menschhorn et al. | 162/5 |
| 4,518,459 | 5/1985 | Freis et al. | 162/5 |
| 4,586,982 | 5/1986 | Poppel et al. | 162/5 |
| 4,643,800 | 2/1987 | Maloney et al. | 162/5 |
| 4,666,558 | 5/1987 | Wood et al. | 162/8 |
| 4,710,267 | 12/1987 | Elsby et al. | 162/8 |
| 4,820,379 | 4/1989 | Darlington | 162/5 |
| 4,959,123 | 9/1990 | Lehmann et al. | 162/8 |

FOREIGN PATENT DOCUMENTS 3031804  3/1976  Japan ............................... 162/5

OTHER PUBLICATIONS

Darlington, W. B., "A New Process for Deinking Electrostatic-Printed Secondary Fiber", *TAPPI Proceedings*, 1988 Pulping Conference, pp. 95–100.

*Primary Examiner*—Karen M. Hastings
*Attorney, Agent, or Firm*—Alexander D. Ricci; Richard A. Paikoff

[57] ABSTRACT

A method for deinking dry toner electrostatic printed wastepaper is disclosed. The method includes administering a sufficient amount of an ethoxylated surfactant, propoxylated surfactant, esterified surfactant or alkanolamide surfactant having an HLB value of less than 10.0 to a sample of electrostatic printed wastepaper for which treatment is desired.

9 Claims, No Drawings

USE OF SURFACTANTS HAVING AN HLB LESS THAN 10 IN THE DEINKING OF DRY TONER ELECTROSTATIC PRINTED WASTEPAPER

BACKGROUND OF THE INVENTION

Dry toner electrostatic printing inks, including laser and xerographic inks, are important and growing contaminants in the area of waste paper recycling. Traditionally, paper has been printed with water or oil-based inks which were adequately removed by conventional deinking procedures. In these methods, secondary fiber is mechanically pulped and contacted with an aqueous medium containing a surfactant. Ink is separated from pulp fibers as a result of mechanical pulping and the action of the surfactant. The dispersed ink is separated from pulp fibers by such means as washing or flotation.

Conventional deinking processes have shown minimal success in dealing with dry toner electrostatic printing inks, with the necessary chemical and mechanical treatments of the furnish proving to be time consuming and often rendering a furnish which is unacceptable for many applications. The development of a deinking program for office waste contaminated with electrostatic printed copy will make this furnish more amenable to the recycling process.

The ability to recycle office waste will prove commercially advantageous and will have a significant impact on the conservation of virgin fiber resources. Although electrostatic printed waste has not reached the volume of impact printed waste commonly seen in the industry, indications are such that usage of electrostatic print is increasing steadily and that waste copies available to the recycling industry will also increase.

The present invention enhances the agglomeration and subsequent removal of electrostatic toner particles through centrifugal cleaners by using specific commercially available raw materials. It is believed that this can be accomplished at a wide range of pH levels (5.0 to 11.0) and will render a furnish that is virtually free of electrostatic printing ink after subsequent mechanical treatment. The invention allows for the separation of ink particles and associated binder from pulp fibers, and causes the particles to agglomerate to a critical range of size and density, which affords their most efficient removal from the pulp slurry by centrifugal cleaners.

The present invention demonstrates that specific surfactants with low HLBs enhance the agglomeration of electrostatic toner particles, allowing removal through centrifugal cleaning and/or screening. HLB is an abbreviation for hydrophile-lipophile balance as related to the oil and water solubility of a material. A high HLB indicates that the hydrophilic portion of the molecule is dominant, while a low HLB indicates that the hydrophobic portion of the molecule is dominant. The water solubility of materials increases with increasing HLB. Traditional deinking processes utilize a wide variety of high HLB (generally greater than 10) nonionic and/or anionic surfactants or dispersants to wet and disperse ink particles to a range of size (about 0.5 to 15 microns) which allows for their most efficient subsequent removal by washing and/or froth flotation processes.

Agglomeration is anticipated to be seen at pH levels ranging from 5.0 to 11.0, with no significant deposition of ink expected to be present on pulping equipment. The advantage of the present invention is that it allows for agglomeration at an ambient pH, alleviating the need for caustic or acid tanks in the mill environment.

SUMMARY OF THE INVENTION

The components of the present invention comprise individual surfactants with hydrophile/lipophile balances of less than or equal to 10.0. It is expected that these components will also be effective when combined with aliphatic petroleum distillates (solvents). (The solvents are saturated hydrocarbons having carbon numbers in the range of C9–C12.) All components are commercially available.

DETAILED DESCRIPTION OF THE PREFERRED EMBODIMENTS

The present inventors have discovered that the addition of an ethoxylated surfactant, propoxylated surfactant, esterified surfactant or alkanolamide surfactant to the pulper significantly enhances the agglomeration of electrostatic toner particles, allowing for their separation from fiber through centrifugal cleaning and/or screening. This agglomeration is anticipated to be seen at pH levels ranging from 5.0 to 11.0, with no significant deposition of ink expected to be present on pulping equipment. (A pH higher than 11.0 or lower than 5.0 is also believed to be effective). The individual surfactants allow for agglomeration at an ambient pH, alleviating the need for caustic or acid tanks in the mill environment. The raw materials which are expected to be effective in this invention include:

1. Ethoxylated octylphenols
2. Ethoxylated nonylphenols
3. Dodecylphenol ethoxylates
4. Dialkylphenol ethoxylates
5. Ethoxylated polyoxypropylene glycols
6. Propoxylated polyoxypropylene glycols
7. Primary alcohol ethoxylates
8. Secondary alcohol ethoxylates
9. Glycerol esters of fatty acids
10. Ethoxylated fatty esters
11. Propoxylated fatty esters
12. Sorbitan esters
13. Fatty acid diethanolamides
14. Ethoxylated tertiary amines
15. Polyethoxylated and polypropoxylated polydimethyl siloxanes The chemical structures of the raw materials are as follows:

Ethoxylated Octylphenols

n=1–5

Ethoxylated Nonylphenols

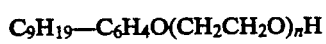

n=1–5

Dodecylphenol Ethoxylates

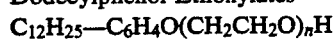

n=1–6

Dialkylphenol Ethoxylates

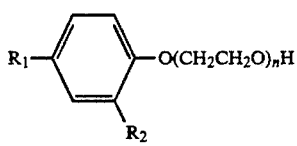

n = 1–9
$R_1 = R_2 = C_8H_{17}, C_9H_{19}$ or $C_{12}H_{25}$

Ethoxylated Polyoxypropylene Glycols

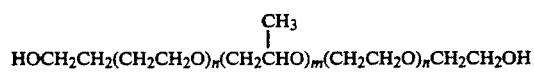

n = 1–45
m = 14–77

Propoxylated Polyoxyethylene Glycols

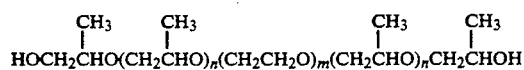

n = 14–77
m = 1–45

Primary Alcohol Ethoxylates $CH_3-(CH_2)_x-CH_2O(CH_2CH_2O)_nH$
x = 4–16
n = 1–10

Secondary Alcohol Ethoxylates

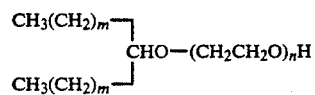

n = 1–8
m = 9–12

Glycerol Esters of Fatty Acids

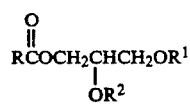

$R = R^1 = R^2 =$ caprylic, capric, lauric, myristic, palmitic, palmitoleic, stearic, oleic, linoleic, linolenic, alpha-eleostearic, ricinoleic, gadoleic, arachidonic, behenic, pelargonic, iso-oleic, iso-stearic
$R^1 = R^2 = -H$
$R \neq -H$

Ethoxylated Fatty Esters

$n \leq 9$
$R = R^1 =$ caprylic, capric, lauric, myristic, palmitic, palmitoleic, stearic, oleic, linoleic, linolenic, alpha-eleostearic, ricinoleic, gadoleic, arachidonic, behenic, pelargonic, iso-oleic, iso-stearic
$R^1 = -H$
$R \neq -H$

Propoxylated Fatty Esters

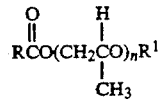

n = 2–10
$R = R^1 =$ caprylic, capric, lauric, myristic, palmitic, palmitoleic, stearic, oleic, linoleic, linolenic, alpha-eleostearic, ricinoleic, gadoleic, arachidonic, behenic, pelargonic, iso-oleic, iso-stearic
$R^1 = H$

Sorbitan Esters

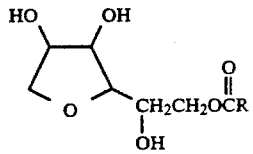

R = caprylic, capric, lauric, myristic, palmitic, palmitoleic, stearic, oleic, linoleic, linolenic, alpha-eleostearic, ricinoleic, gadoleic, arachidonic, behenic, pelargonic, iso-oleic, iso-stearic

Fatty Acid Diethanolamides

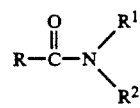

R = caprylic, capric, lauric, myristic, palmitic, palmitoleic, stearic, oleic, linoleic, linolenic, alpha-eleostearic, ricinoleic, gadoleic, arachidonic, behenic, pelargonic, iso-oleic, iso-stearic $R^1, R^2 = -H, -CH_2CH_2OH, -CH_2CHOH | CH_3$

Ethoxylated Tertiary Amines

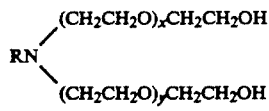

R = caprylic, capric, lauric, myristic, palmitic, palmitoleic, stearic, oleic, linoleic, linolenic, alpha-eleostearic, ricinoleic, gadoleic, arachidonic, behenic, pelargonic, iso-oleic, iso-stearic, rosin
x = y = 1–6

Polyethoxylated and polypropoxylated polydimethyl siloxanes (molecular weight = 600–20,000), as well as sorbitan ester ethoxylates are also anticipated to be effective surfactants in the agglomeration of electrostatic toner particles.

For the application of electrostatic toner particle agglomeration, the effective hydrophile—lipophile balance of the tested surfactants is less than or equal to 10. It is believed that the effective temperature range for the agglomeration of electrostatic toner particles is from 110°–190° F.

A beaker test method was utilized to determine the impact of various raw materials on toner agglomeration without the presence of fiber. This method allowed for the visual evaluation of toner configuration after treatment and permitted the particles to be sized using the Brinkmann Particle Size Analyzer. When raw materials were screened using this method, those demonstrating significant particle agglomeration were advanced to the Deinking/Repulping Apparatus (the pulper) for an evaluation of performance in the presence of fiber.

The experimental procedure was as follows: Approximately 0.01 grams of toner was added to a beaker containing 100 milliliters of deionized water. Each solution of toner and water was mixed on a magnetic stirrer at a pH of 7.0, a temperature of 150° F. and a contact time of 60 minutes. About 514 parts of raw material per million parts of solution was added to the beaker. Upon completion of contact time, particle configurations were noted, and solutions were filtered and held for size evaluation using the Brinkmann Particle Size Analyzer.

The pulper was then used to evaluate selected raw materials. This apparatus consists of a Waring blender jar with the blades reversed to provide a mixing action of the fibers. The stirring of the blender is controlled by a motor connected to a Servodyne controller. Temperature of the pulp in the blender is provided by a heating mat attached to a temperature controller. The typical furnish consistency in the laboratory pulper is 5%, and a stirring speed of 750 rpm is used to simulate the mechanical action of a hydropulper.

Electrostatic printed wood-free fiber was used as the furnish. Twenty pounds of raw material per ton of fiber were added to the pulper, at a temperature of 150° F., a pH of 7.0, and a pulping time of 60 minutes. In Table 1, toner particle agglomeration or the lack thereof through the use of individual surfactants is listed.

TABLE 1

| FUNCTIONAL GROUP | HLB | TONER PARTICLE APPEARANCE* | |
|---|---|---|---|
| NONIONIC HYDROCARBONS | | | |
| Ethoxylated Octylphenols | 3.6 | agglomerated | $n = 1.5$ |
|  | 15.8 | no effect | $n = 10.0$ |
| Ethoxylated Nonylphenols | 4.6 | agglomerated | $n = 1.5$ |
|  | 12.9 | no effect | $n = 9.5$ |
|  | 17.2 | no effect | $n = 49$ |
| Ethoxylated Polyoxypropylene Glycols | 0.5 | agglomerated | $n = 9\ m = 69$ |
|  | 1.0 | agglomerated | $n = 13\ m = 56$ |
|  | 18.5 | no effect | $n = 3\ m = 15$ |
|  | 1.0 | agglomerated | $n = 13\ m = 56$ |
|  | 12.0 | no effect | $n = 3\ m = 16$ |
| Primary Alcohol Ethoxylates | 4.6 | agglomerated | $n = 2.0\ X = 16$ |
|  | 12.2 | no effect | $n = 9.0\ X = 16$ |
|  | 6.0 | agglomerated | $n = 4.0\ X = 6-8$ |
| Glycerol Esters of Fatty Acids | 0.8 | agglomerated | $R = R^1 =$ Oleic |
|  | 1.6 | agglomerated | $R =$ Oleic, $R^1 =$ H |
|  | 2.5 | agglomerated | $R =$ Oleic, $R^1 =$ H |
|  | 2.7 | agglomerated | $R =$ Oleic, $R^1 =$ H |
|  | 2.7 | agglomerated | $R =$ Stearic, $R^1 =$ H |
|  | 2.9 | agglomerated | $R =$ Isostearic, $R^1 =$ H |
|  | 2.8 | agglomerated | $R, R^1 =$ fatty acid |
| Ethoxylated Fatty Esters | 8.0 | agglomerated | $n = 5\ R =$ Oleic, $R^1 =$ H |
|  | 13.5 | no effect | $n = 14\ R =$ Oleic, $R^1 =$ H |
|  | 2.0 | agglomerated | $n = 1\ R =$ Stearic, $R^1 =$ H |
|  | 3.0 | agglomerated | $n = 1\ R =$ Stearic, $R^1 =$ H |
|  | 18.0 | no effect | $n = 40\ R =$ Stearic, $R^1 =$ H |
| Propoxylated Fatty Esters | 1.8 | agglomerated | $R =$ Stearic, $R^1 =$ H (monoester) |
|  | 1.8 | agglomerated | $R =$ Stearic, $R^1 =$ H and Stearic (at least 95% monoester) |
|  | 3.5 | agglomerated | $R =$ Stearic, $R^1 =$ H and Stearic (at least 67% monoester) |
| Sorbitan Esters | 1.8 | agglomerated | $R =$ Trioleic |
|  | 2.1 | agglomerated | $R =$ Tristearic |
|  | 2.7 | agglomerated | $R =$ Sesquioleic |
|  | 14.9 | no effect | $R =$ Stearic |
| Fatty Acid Diethanolamides | 1–7 | agglomerated | $R =$ Oleic $R^1 =$ H, $R^2 = CH_2CHOH$ with $CH_3$ |
|  | >10.0 | no effect | $R =$ Coco $R^1 =$ $R^2 = CH_2CH_2OH$ |
|  | >10.0 | no effect | $R =$ Coco $R^1 =$ $R^2 = CH_2CH_2OH$ |
| CATIONIC HYDROCARBONS | | | |
| Ethoxylated Tertiary Amines | 5.0 | agglomerated | $R =$ tallow $x + y = 2$ |
|  | 12.0 | no effect | $R =$ tallow $x + y = 7$ |
| ANIONIC HYDROCARBONS | | | |
| Organic Phosphate Esters | 13–15 | no effect | |
|  | 13–15 | no effect | |
| SILOXANES | | | |
| Polyethoxylated and polypropoxylated polydimethyl siloxanes | 5.0 | agglomerated | |
|  | 9.0 | agglomerated | |
|  | 17.0 | no effect | |

*agglomeration: particle size > approx. 10 microns
no effect: particle size > approx. 10 microns While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A method for deinking electrostatic printed wastepaper consisting essentially of adding to an aqueous slurry of the electrostatic printed wastepaper an amount, sufficient for the intended purpose, of a surfactant chosen from the group consisting of an ethoxylated surfactant, propoxylated surfactant, esterified surfactant and alkanolamide surfactant, said surfactant having a hydrophile/lipophile balance of from about 0.5 to 10.0, said method enhancing the agglomeration of electrostatic toner particles and allowing for the separation of the particles from pulp fibers.

2. The method as recited in claim 1 wherein an ethoxylated surfactant is added, and said ethoxylated surfactant is selected from the group consisting of ethoxylated octylphenols, ethoxylated nonylphenols, dodecylphenol ethoxylates, dialkylphenol ethoxylates, ethoxylated polyoxypropylene glycols, primary alcohol ethoxylates, secondary alcohol ethoxylates, ethoxylated fatty esters, ethoxylated tertiary amines and polyethoxylated polydimethyl siloxanes.

3. The method as recited in claim 1 wherein a propoxylated surfactant is added, and said propoxylated surfactant is selected from the group consisting of propoxylated polyoxyethylene glycols, propoxylated fatty esters and polypropoxylated polydimethyl siloxanes.

4. The method as recited in claim 1 wherein an esterified surfactant is added, and said esterified surfactant is selected from the group consisting of glycerol esters of fatty acids and sorbitan esters.

5. The method as recited in claim 1 wherein an alkanolamide surfactant is added, and said alkanolamide surfactant is a fatty acid diethanolamide.

6. The method as recited in claim 1 wherein aliphatic petroleum distillates are combined with the ethoxylated surfactant, propoxylated surfactant, esterified surfactant or alkanolamide surfactant.

7. The method as recited in claim 6 wherein the aliphatic petroleum distillates are saturated hydrocarbons having carbon numbers in the range of C9–C12.

8. The method as recited in claim 1 wherein agglomeration of electrostatic toner particles occurs at a temperature of about 110° to 190° F.

9. The method as recited in claim 1 wherein agglomeration of electrostatic toner particles occurs at a pH of about 5.0 to 12.0.

* * * * *